Patented Oct. 11, 1932

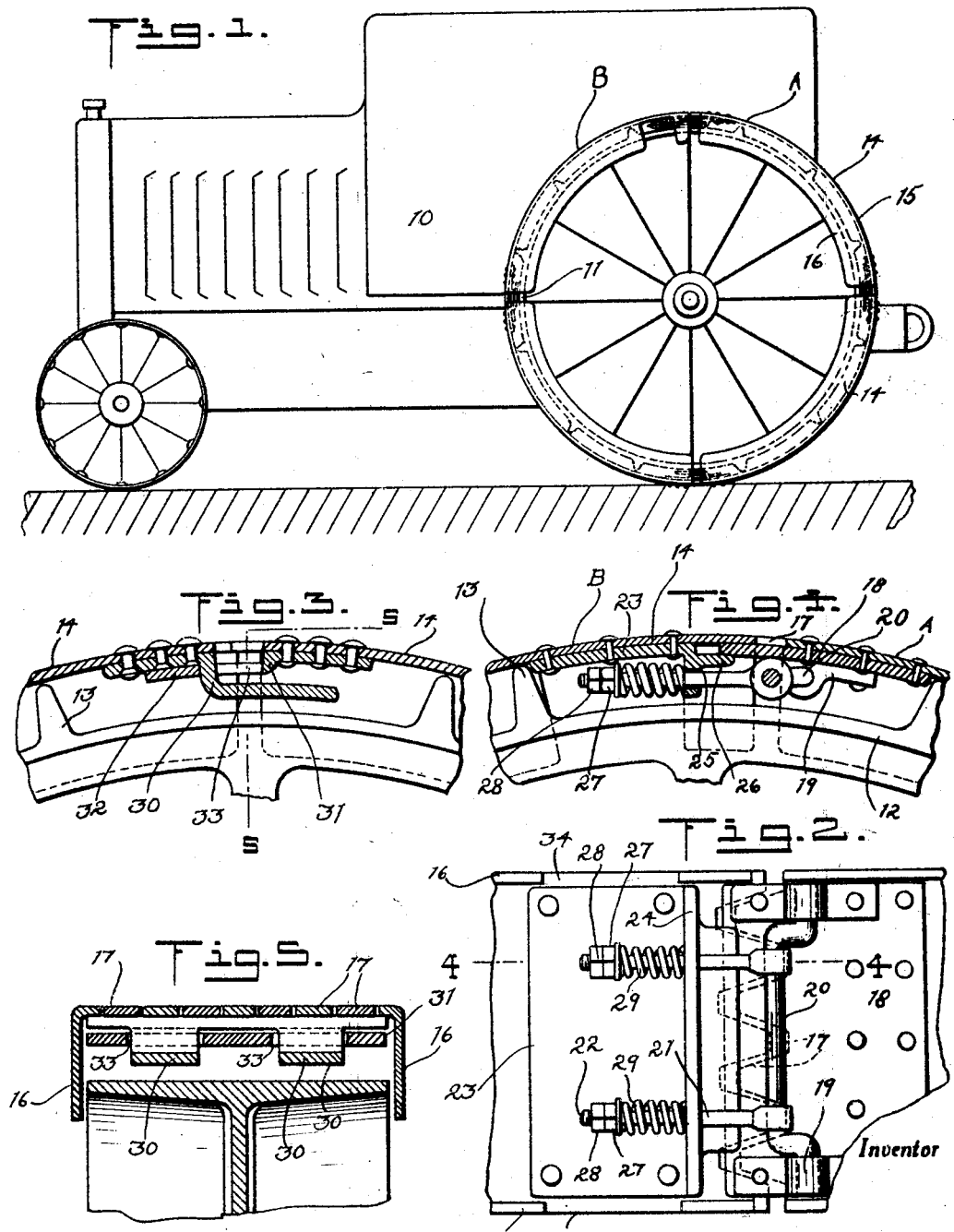

1,882,373

UNITED STATES PATENT OFFICE

MILLER D. STORM, OF BOUTON, IOWA

TRACTOR WHEEL ATTACHMENT

Application filed April 28, 1931. Serial No. 533,554.

This invention relates to improvements in traction wheel attachments and more particularly to protection rims therefor.

The primary object of the invention is to provide a demountable protector rim which may be applied to a tractor wheel to protect roads and streets from injury which would otherwise be caused by the lugs, cleats, or other like traction elements digging into the surface of the roadway during the passage of the traction wheel thereover.

A further object of the invention is to provide a traction wheel protector rim which may be attached or removed from a traction wheel without the use of special tools, and when in an applied position, the same is prevented from accidental slipping both circumferentially and transversely of the wheel.

A further object is the provision of a plurality of detachably connected segmental shaped rim sections, and means for maintaining said rim sections in a contracted position about the tread of a traction wheel.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a side elevational view of a tractor showing my improved protector rim in position upon a traction wheel thereof.

Figure 2 is an inside plan view of a fragmentary portion of the protector rim showing the spring joint between the meeting ends of two of the rim sections.

Figure 3 is a detail vertical sectional view through one of the joints connecting the meeting ends of certain of the sections.

Figure 4 is a detail vertical sectional view on the line 4—4 of Figure 2.

Figure 5 is a vertical transverse sectional view on the line 5—5 of Figure 3.

Referring to the drawing by reference characters, the numeral 10 illustrates in conventional form, a tractor which is provided with a traction wheel 11, the rim 12 of the traction wheel being provided with the usual traction cleats or lugs 13 which when the tractor is in use upon soft ground serve to increase the traction qualities of the wheel. However, there are times when the tractor is driven over a hard street or road, and at such times, the traction elements 13 are apt to injure or dig up the street or roadway. It is therefore my invention to produce a protector or auxiliary rim for the wheel 11, which protector rim comprises a plurality of segmental shaped rim sections 14 which are identical in construction as each includes a smooth tread surface or curved wall 15, and inwardly extending side flanges 16.

All of the rim sections 14 have their ends provided with spaced fingers 17, the fingers 17 of one rim section fitting in the spaces between the fingers of the next adjacent rim section to produce a staggered joint between the meeting ends of the respective sections as shown in dotted lines in Figure 2 of the drawing.

One of the rim sections 14 which I shall designate by the letter A has one of its ends provided with a plate 18, which is riveted to the under side thereof but which terminates with the adjacent end of the said section. Mounted on the plate 18 is a pair of spaced bearings 19 in which the opposite ends of a crank shaft 20 are journaled, while pivoted to the crank shaft 20 in spaced relation is a pair of rods 21. The outer free ends of these rods are screw threaded as at 22 for a purpose to be presently explained.

One end of one of the rim sections 14 which I will refer to as section B has a plate 23 riveted to the inner side thereof, and this plate is formed with an inwardly extending flange 24 having openings 25 therein for a purpose to accommodate the rods 21. This plate also includes a flange 26 which is disposed at right angles to the flange 24 and which is arranged in spaced relation to the outer curved wall 14 of the said section B. The space between the flange 26 and the wall 14 of the section B accommodates the outer end of the plate 18 to provide a lap joint between the meeting ends of the sections A and B. Threaded to the threaded ends 22 of the rods 21 are removable nuts 27 which are backed up and held by jamb nuts 28, while interposed between the nuts 27 and the flange 24 are expansion springs 29. These springs encircle the rods 21 and serve to exert a tension or pressure upon the crank shaft 20 to pull the sections into contracted position about the tractor wheel as will be appreciated.

The other ends of the sections A and B and the meeting ends of the other sections 14 are connected by separable joints, each joint consisting of Z-shaped tongues 30 riveted to the inner side of one of the meeting ends of a section for engagement with a plate 31 carried by the adjacent meeting end of the next rim section. The plate 31 is formed with an offset portion 32 which is provided with spaced slots 33 which facilitate the passage of the Z-shaped tongues 30 as best seen in Figure 3 of the drawing. The connection formed by the slotted plate 31 and the Z-shaped tongues produces a separable connection between the meeting ends of the sections and when the sections are joined, the springs 29 and the crank shaft 20 act to contract the sections about the rim of the traction wheel.

For facilitating access to the nuts 27 and 28, portions of the side flanges 16 of the rim section B are cut away as at 34 whereby a wrench may be inserted through the side of the protector rim to permit turning of the nuts when it is desired to break the joint between the sections A and B or when it becomes necessary to effect a connection therebetween or to vary the tension of the springs 29.

To attach the segmental sections 14 to a traction wheel, the sections 14 with the exception of sections A and B are arranged about the wheel and the tongues 30 passed through the slots 33 of the plates 31. After certain of the sections have been thus joined, the sections A and B are connected to the next adjacent rim sections and the bolts 21 inserted through the openings 25 in the flange 24. The springs 29 are then inserted upon the rods 21 and nuts 27 and 28 threaded onto the threaded ends of the said rod. By tightening up upon the nuts, a pull is exerted upon the crank shaft 20 which acts to pull all of the rim sections against the periphery of the traction wheel. When in applied position, the rim protector is prevented from circumferential creeping by reason of the fact that the joints between the sections will strike the traction elements 13 whereas the said rim sections are prevented from lateral movement by reason of the flanges 16 which embrace opposite sides of the rim 12 of the traction wheel 11.

While I have shown and described what I deem to be the most desirable embodiment of my invention, it will be understood that various changes in construction may be resorted to if desired and I do not wish to limit myself to the precise structural details herein shown and described, nor to anything less than the whole of my invention limited only by the appended claims.

Having thus described my invention, what I claim as new, is:—

1. An attachment for a tractor wheel having circumferentially spaced peripheral cleats, comprising a plurality of articulated sections of arcuate form adapted to be arranged about the tractor wheel and being provided with radially inwardly projecting side members, one of the sections being provided on the inner side thereof with a plate underlying the adjacent portion of the contiguous section, bearing members attached to the inner surface of said plate and being provided with alined openings extending transversely of the plate, a shaft extending through said alined openings and having the intermediate portion thereof offset to define a crank, a plurality of rods connected to said crank, a second plate secured to the inner side of the contiguous section and having openings slidably receiving said rods, spring means on said rods to tension the same, said second named plate having an offset terminal portion cooperating with the contiguous section in the formation of a recess slidably receiving the said underlying portion of said first named plate, said first and second named plates being arranged between said inwardly projecting side members and adapted to be disposed between a pair of the cleats on the tractor wheel for preventing shifting of the attachment circumferentially on the tractor wheel.

2. An attachment for a tractor wheel having circumferentially spaced peripheral cleats, comprising a plurality of articulated sections of arcuate form adapted to be arranged about the tractor wheel and being provided with radially inwardly projecting side members, one of the sections being provided on the inner side thereof with a plate underlying the adjacent portion of the contiguous section, bearing members attached to the inner surface of said plate and being provided with alined openings extending transversely of the plate, a shaft extending through said alined openings and having the intermediate portion thereof offset to define a crank, a plurality of rods connected to said crank, a second plate secured to the inner side of the contiguous section and having openings slidably receiving said rods, and spring means on said rods to tension the same, said first and second named plates being arranged between said inwardly projecting side members and adapted to be disposed between a pair of the cleats on the tractor wheel for preventing shifting of the attachment circumferentially of the tractor wheel.

In testimony whereof I affix my signature.

MILLER D. STORM.